(12) United States Patent
Fujishita

(10) Patent No.: US 7,685,592 B2
(45) Date of Patent: Mar. 23, 2010

(54) METHOD AND DEVICE FOR UPDATING PROGRAM FUNCTIONS CORRESPONDING TO A VERSION FLAG

(75) Inventor: Kaneaki Fujishita, Chiba (JP)

(73) Assignee: Sony Corporation (JP)

( * ) Notice: Subject to any disclaimer, the term of this patent is extended or adjusted under 35 U.S.C. 154(b) by 911 days.

(21) Appl. No.: 10/311,652

(22) PCT Filed: Apr. 23, 2002

(86) PCT No.: PCT/JP02/04029

§ 371 (c)(1),
(2), (4) Date: May 19, 2003

(87) PCT Pub. No.: WO02/088952

PCT Pub. Date: Nov. 7, 2002

(65) Prior Publication Data

US 2003/0177148 A1  Sep. 18, 2003

(30) Foreign Application Priority Data

Apr. 24, 2001  (JP)  ............................. 2001-125382

(51) Int. Cl.
  *G06F 9/44*   (2006.01)
  *G06F 9/445*  (2006.01)
  *G06F 3/00*   (2006.01)
  *G06F 13/12*  (2006.01)
(52) U.S. Cl. ...................... 717/170; 717/175; 710/10; 710/72
(58) Field of Classification Search ............... 717/168, 717/170, 173
  See application file for complete search history.

(56) References Cited

U.S. PATENT DOCUMENTS 5,504,801 A   4/1996  Moser et al.
5,613,101 A * 3/1997  Lillich ........................ 709/230

(Continued)

FOREIGN PATENT DOCUMENTS

JP  11-259284   9/1999

OTHER PUBLICATIONS

"Versions and workspaces in Microsoft repository", Bergstraesser et al., Jun. 1999, pp. 532-533. Online retrieved at <http://delivery.acm.org/10.1145/310000/304248/p532-bergstraesser.pd>.*

"A multi-version data model for executing real-time transactions in a mobile environment", Lam et al., May 2001, pp. 90-97. Online retrieved at <http://delivery.acm.org/10.1145/380000/376911/p90-lam.pdf>.*

(Continued)

*Primary Examiner*—Tuan Q Dam
*Assistant Examiner*—Thuy Dao
(74) *Attorney, Agent, or Firm*—Lerner, David, Littenberg, Krumholz & Mentlik, LLP

(57) ABSTRACT

In an electronic device for implementing various functions using a DSP, the functionality can be updated as required. The electronic device is provided with a DSP and a flash memory for storing a program executed by the DSP. A program for implementing a new function implements both an old function and the new function, and for implementing a function corresponding to a version flag that has been set in version flags. When the program in the flash memory is updated to a program for implementing the new function, the program for implementing a new function is loaded into the flash memory, and a version flag corresponding to the new function is set in the version flags.

3 Claims, 4 Drawing Sheets

U.S. PATENT DOCUMENTS

| | | | |
|---|---|---|---|
| 5,951,639 A * | 9/1999 | MacInnis | 725/70 |
| 6,289,510 B1 * | 9/2001 | Nakajima | 717/170 |
| 6,609,127 B1 * | 8/2003 | Lee et al. | 707/10 |
| 6,687,901 B1 * | 2/2004 | Imamatsu | 717/173 |
| 6,948,059 B1 * | 9/2005 | Sprecher et al. | 713/100 |
| 6,999,991 B1 * | 2/2006 | Ikeda | 709/206 |

OTHER PUBLICATIONS

"Accumulative versioning file system Moraine and its application to metrics environment MAME", Yamamoto et al., Nov. 2000, pp. 80-87. Online retrieved at <http://delivery.acm.org/10.1145/360000/355057/p80-yamamoto.pdf>.*

* cited by examiner

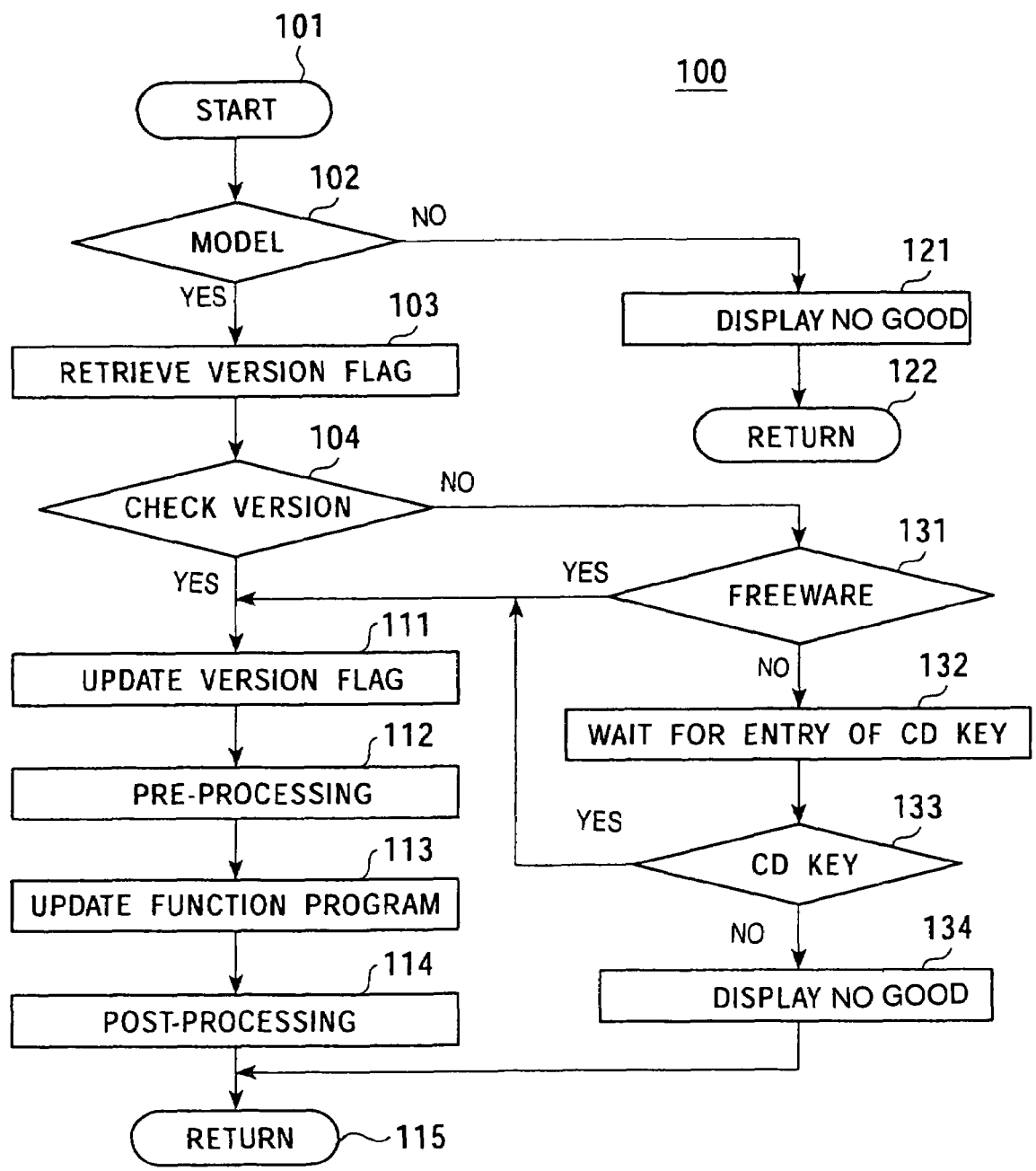

METHOD AND DEVICE FOR UPDATING PROGRAM FUNCTIONS CORRESPONDING TO A VERSION FLAG

TECHNICAL FIELD

The present invention relates to an electronic device which is adapted to implement various functions using a digital signal processor (DSP).

BACKGROUND ART

AV (Audio and Visual) preamplifiers, for example, in which audio signals have been digitized, use a processing circuit such as a DSP to perform signal processing such as decoding, effecting, and equalizing. When the DSP is used, a program executed by the DSP can be modified to change the content to be processed.

Therefore, there has been conceived an AV preamplifier which is provided with a non-volatile, rewritable memory in which a program executed by the DSP is stored. This allows the program stored in the non-volatile memory to be rewritten to update functionality of the AV amplifier or add a new function, so that the functionality of the AV amplifier can be up-to-date at any time.

For example, when a novel encoding method is used for a digital audio signal, the corresponding decoding method can be added to the AV amplifier, or, when new effecting is put into practice, the effecting can be added to the AV amplifier. Furthermore, a program executed by the DSP can be improved to obtain a higher quality audio signal, or a bug can be removed from a bugged program. Thus, the AV amplifier can be upgraded to an up-to-date one.

A flash memory has been used in general as the above-noted non-volatile, rewritable memory. In order to rewrite a program stored in the flash memory, it is necessary to erase the program in the flash memory before rewriting.

If a new function is added while an old function remains, the overall content of the flash memory must be rewritten, and it is therefore necessary to install versions in order, such as Ver. 1→Ver. 2→Ver. 3, in order to update the functionality. Thus, it is impossible to select and install only a function that is newly added in Ver. 3 to update the functionality.

In addition, functions newly added by versions are of different value from one version to another. As a result, for example, even if a function that is added in Ver. 3 is of less value than a function that is added in Ver. 2, it is necessary to set the price of Ver. 3 to a higher price than that of Ver. 2 although Ver. 3 must have been offered at a lower price.

The present invention is intended to solve such problems.

DISCLOSURE OF INVENTION

According to the present invention, an electronic device is provided, which includes:
for example, a non-volatile, rewritable memory;
a DSP for executing a program P written in the non-volatile memory to implement a predetermined function; a control circuit for performing predetermined control; an input circuit; and version flags stored in the non-volatile memory,
wherein a program Q for implementing a new function as the above-described function is a program for implementing an old function and the new function, and has content for implementing a function corresponding to a version flag out of the version flags which has been set; and
the predetermined control is such that, when the program P in the non-volatile memory is updated to the program Q for implementing the new function, the program Q for implementing the new function is loaded into the nonvolatile memory via the input circuit, and
a version flag of the version flags which corresponds to the new function is set.

Therefore, only a function corresponding to a bit of version flag bits which is set to "1" can be implemented.

BRIEF DESCRIPTION OF THE DRAWINGS

FIG. 2 is a flowchart showing one embodiment of the present invention.

DESCRIPTION OF THE PREFERRED EMBODIMENTS

Figure 1:
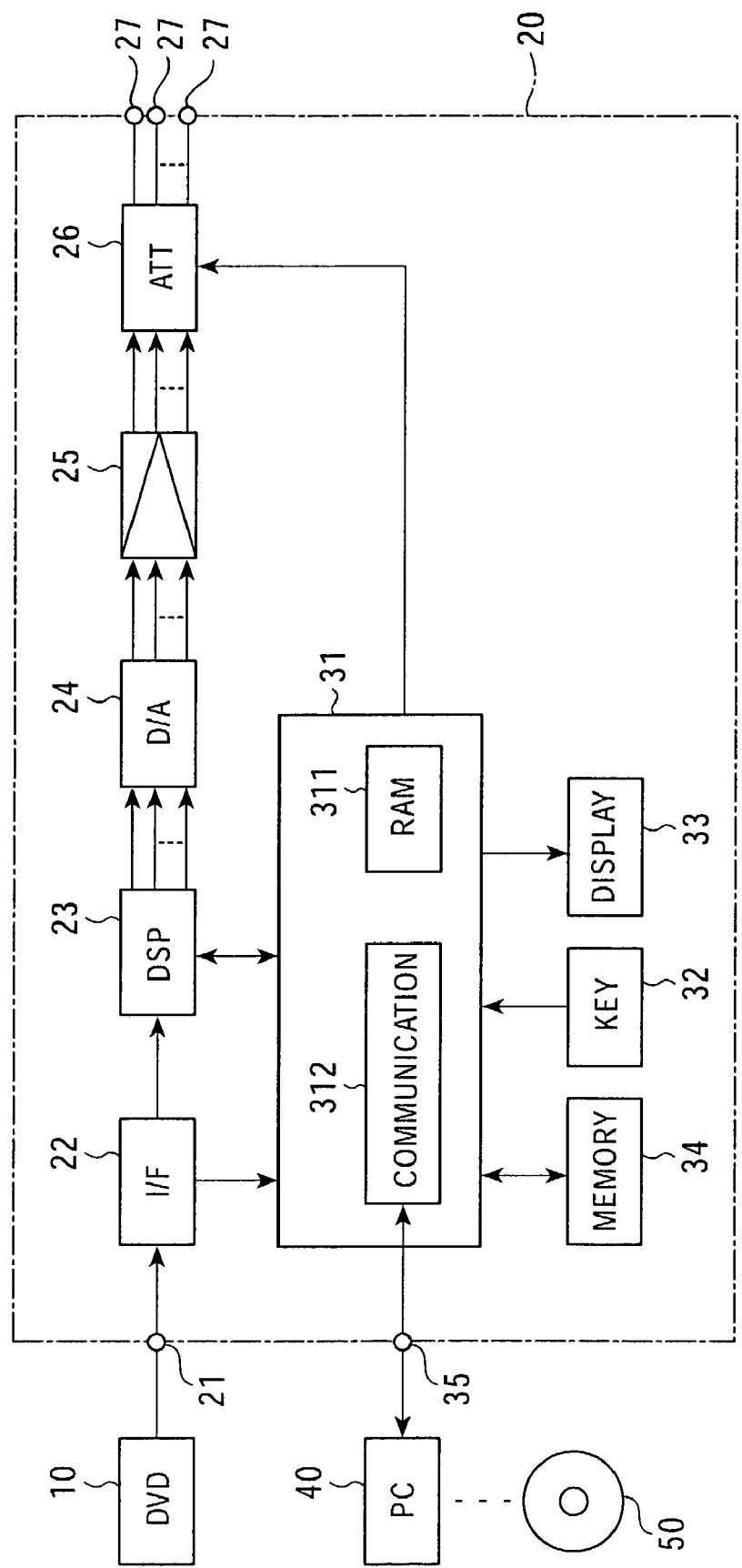
FIG. 1 is a schematic diagram showing one embodiment of the present invention.

FIG. 1 shows an example in which the present invention is embodied as an AV amplifier supporting 5.1 channel audio, in which reference numeral 10 denotes a DVD (Digital Versatile Disc) player, and reference numeral 20 denotes an AV amplifier.

The DVD player 10 is a signal source in 5.1 channel audio. In the DVD player 10, a DVD is played back, and a playback signal therefor is output in the form of a serial digital audio signal according to IEC (International Electrotechnical Commission)-958 standard (so-called SPDIF (Sony Philips Digital InterFace) standard), and the digital audio signal is supplied to the AV amplifier 20.

In the AV amplifier 20, the digital audio signal supplied from the DVD player 10 is supplied to a DSP 23 through an input connector 21 and an interface circuit 22. The DSP 23 decodes the digital audio signal from the interface circuit 22 into digital audio signals on six channels (left front, right front, left side, right side, central front, and bass channels), and performs processing, such as effecting and equalizing, on the digital audio signals.

The six-channel digital audio signals output from the DSP 23 are supplied to a D/A (Digital to Analog) converter circuit 24 for D/A conversion into six-channel analog audio signals. The analog audio signals are passed through an amplifier 25 and a variable attenuator circuit 26 for adjusting main sound volume to output terminals 27.

The AV amplifier 20 is further provided with a microcomputer 31 as a control circuit, and a signal indicating the type of playback signal supplied to the interface circuit 22 is supplied to the microcomputer 31 from the interface circuit 22.

The microcomputer 31 is connected to an operation key (or an operation toggle) 32 and a display, such as an LCD (Liquid Crystal Display) 33. When the operation key 32 is operated, the microcomputer 31 controls the DSP 23 to modify the playback mode, the effect type, or the like. Various information such as the operating state of the AV amplifier 20 is displayed on the LCD 33. A predetermined control signal is supplied to the variable attenuator circuit 26 from the microcomputer 31 to control the level of the analog audio signals output to the output terminals 27 according to operation using the operation key 32.

The microcomputer 31 is further connected to a flash memory 34 as a non-volatile, rewritable memory. The flash memory 34 stores a program executed by the DSP 23 and various information. The program stored in the flash memory 34 is executed by the DSP 23, thus allowing the above-described functions such as decoding, effecting, and equalizing to be implemented. The program executed by the DSP 23 in order to implement the functions of the AV amplifier 20 is hereinafter referred to as a "function program".

Figure 4A:
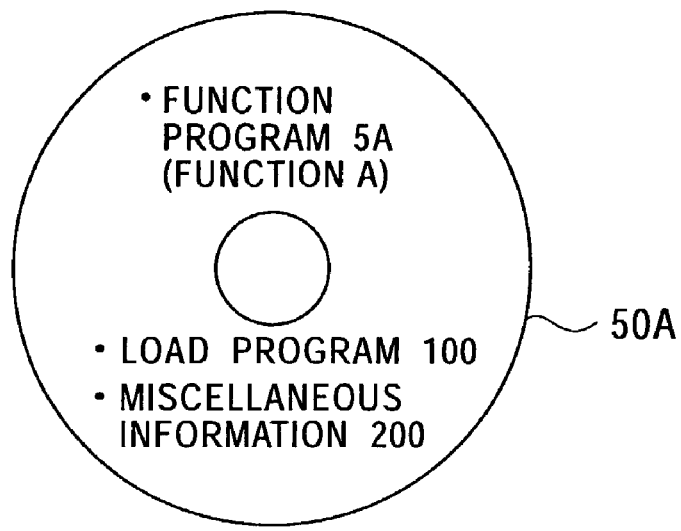
FIGS. 4A to 4C are diagrams showing data in CD-ROMs.
Figure 4B:
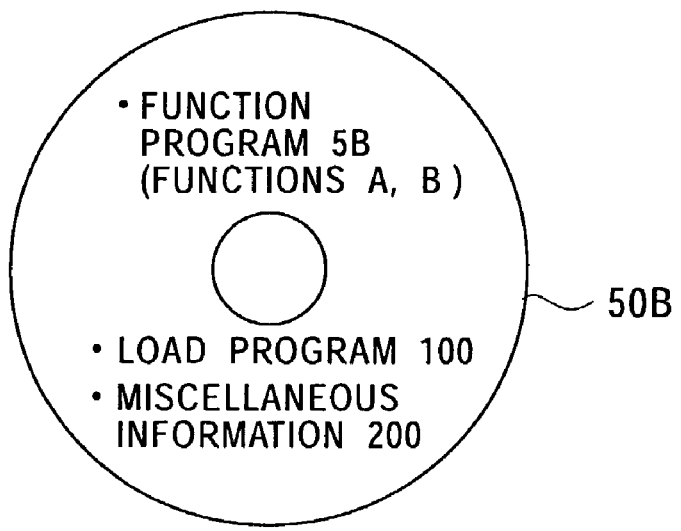
Figure 4C:
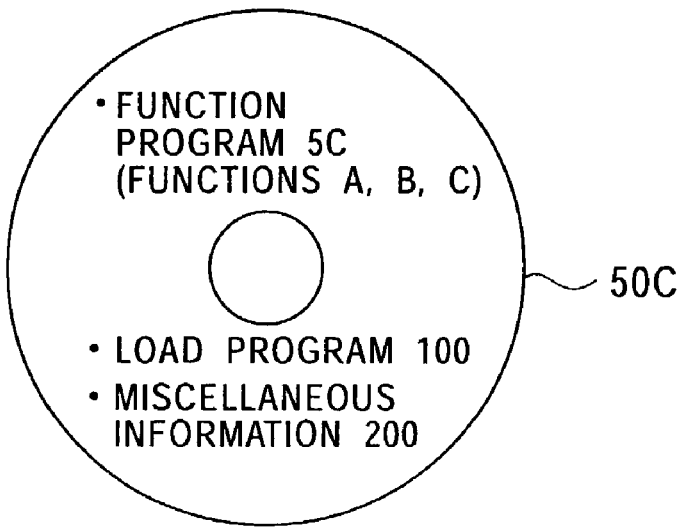

In this example, the function program stored in the flash memory 34 is provided by a CD-ROM (CD Read Only Memory) 50, and the CD-ROM 50 stores data shown in FIGS. 4A to 4C, by way of example.

It is assumed herein that a vendor of the AV amplifier 20 develops and markets a function program for implementing a new function A, after which the vendor develops and markets a function program for implementing a function B, after which the vendor develops and markets a function program for implementing a function C.

Then, when the vendor develops and markets the function program for implementing the function A, the vendor markets a CD-ROM 50A having a function program 5A, a load program 100, and miscellaneous information 200 recorded therein, as shown in FIG. 4A. When the vendor develops and markets the function program for implementing the function B, the vendor markets a CD-ROM 50B having a function program 5B, a load program 100, and miscellaneous information 200 recorded therein, as shown in FIG. 4B. When the vendor develops and markets the function program for implementing the function C, the vendor markets a CD-ROM 50C having a function program SC, a load program 100, and miscellaneous information 200 recorded therein, as shown in FIG. 4C.

The function program 5A is a program executed by the DSP 23 in the AV amplifier 20 to implement the function A. The function program 5B is a program executed by the DSP 23 in the AV amplifier 20 to implement the function B as well as the function A when bit 0 (LSB (Least Significant Bit)) of a version flag VFLG shown in FIG. 3B, which is stored in the flash memory 34 of the AV amplifier 20, is checked and is set to "1", as described in detail below.

Figure 3A:
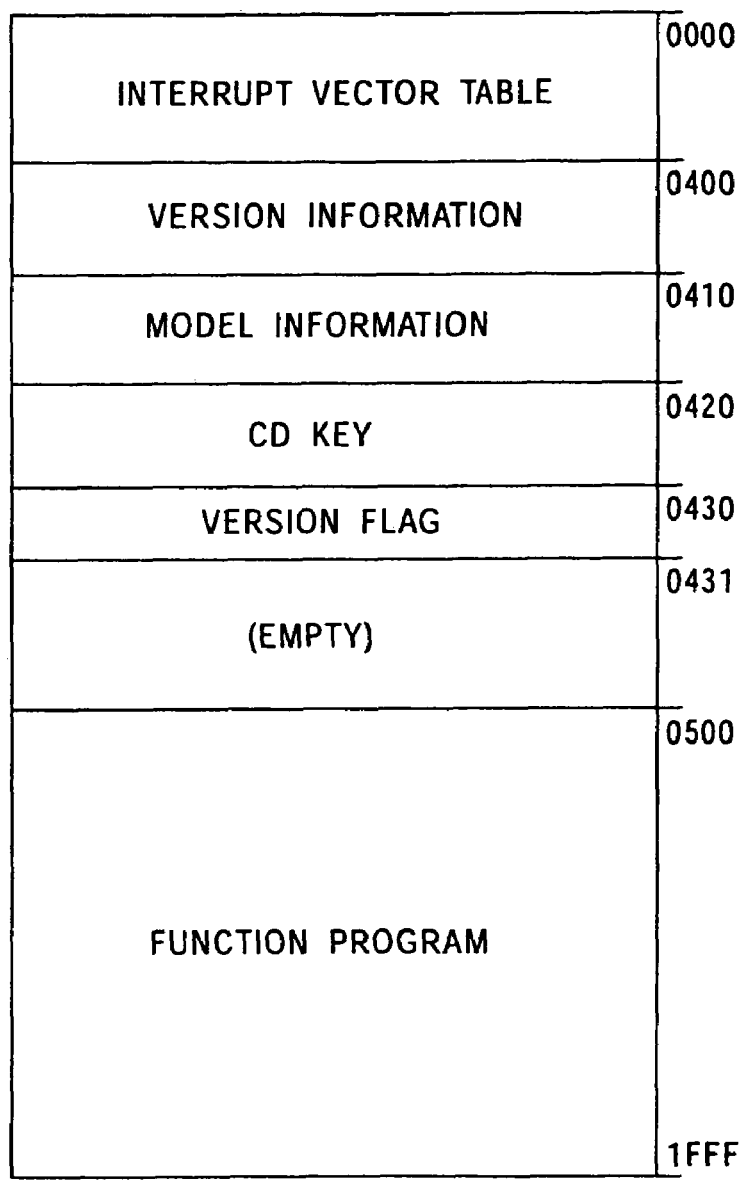
FIGS. 3A and 3B are diagrams showing one form of a memory map.
Figure 3B:
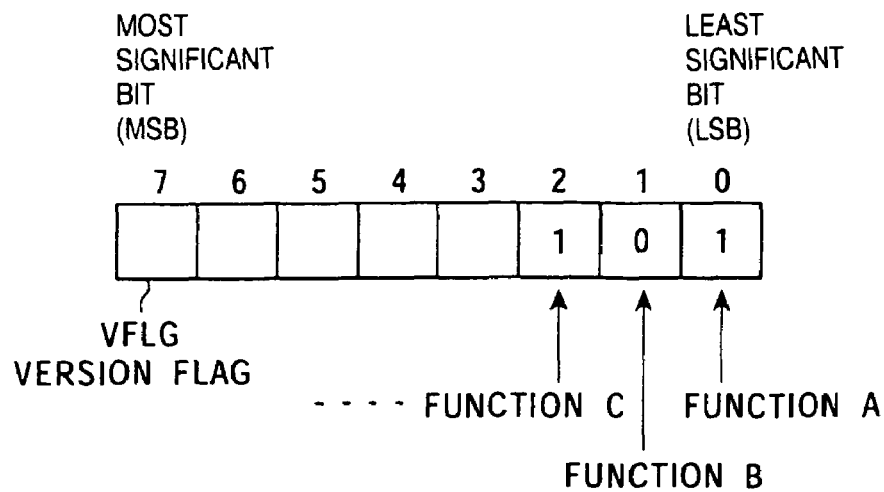

The function program 5C is executed by the DSP 23 in the AV amplifier 20 to implement the function C as well as the function A when bits 0 and 1 of the version flag VFLG shown in FIG. 3B are checked and when bit 0 is set to "1" and the function B when bit 1 is set to "1".

Therefore, the function program is such that an up-to-date function at the time when the function program was developed is implemented without condition, while the previous function is implemented only when the corresponding bit of the version flag VFLG is "1".

The load program 100 is a program for loading a function program into the flash memory 34 from the CD-ROM 50. The load program 100 is transferred to a RAM (Random Access Memory) 311 of the microcomputer 31 from the CD-ROM 50, and is then executed by a CPU (Central Processing Unit) (not shown) of the microcomputer 31. For example, the load program 100 has a structure shown in FIG. 2. Although a detailed description of the load program 100 is made below, only a portion relevant to the present invention is depicted in FIG. 2.

The miscellaneous information 200 includes information indicating a model which can be updated by the CD-ROM 50.

A seal imprinted with a CD key (identification code) for identifying the CD-ROM 50 is affixed to a plastic case which receives the CD-ROM 50.

The microcomputer 31 in the AV amplifier 20 is further provided with a communication port 312 which is specified by, for example, the RS-232C standard, for transferring the function program and the load program in the CD-ROM 50 to the AV amplifier 20, and the port 312 is connected to a connector 35. When the function program is loaded into the flash memory 34, a personal computer 40 is connected with the connector 35.

FIG. 3A shows an exemplary memory map of the flash memory 34. In this example, addresses 0 to 1FFFh (h indicates hexadecimal) are assigned to the flash memory 34, in which the addresses 400h to 40Fh indicate a storage area for version information of the loaded function program. The addresses 410h to 41Fh indicate a storage area for information indicating the model of the AV amplifier 20, etc., and the addresses 420h to 42Fh indicate a storage area for a CD (Compact Disc) key for identifying the CD-ROM 50.

The address 430h indicates a storage area for the version flag VFLG, and the address 500h and the following addresses indicate a storage area for the function program. In this case, as shown in FIG. 3B, for example, each bit of the version flag VFLG corresponds to each of the functions implemented by the DSP 23, and is set to "1" indicating that implementation of the corresponding function is allowed and to "0" indicating that it is not allowed.

For example, in FIG. 3B, bit 0 corresponds to the function A, which is "1", thus indicating that implementation of the function A is allowed; and bit 1 corresponds to the function B, which is "0", thus indicating that implementation of the function B is not allowed.

In this configuration, when a DVD is played back, a playback signal from the player 10 is supplied to the DSP 23 through the input connector 21 and the interface circuit 22, and is then decoded into digital audio signals on the respective channels. The processing, such as effecting and equalizing, corresponding to operation using the operation key 32 is further performed.

The digital audio signals processed by the DSP 23 are subjected to D/A conversion by the D/A converter circuit 24 into analog audio signals, and the analog audio signals are passed through the amplifier 25 and the variable attenuator circuit 26 for adjusting main sound volume to the output terminals 27.

On the other hand, the functionality of the AV amplifier 20 is updated as follows: when the functionality is updated, the personal computer 40 is connected to the connector 35, and the CD-ROM 50 is set in the personal computer 40. The CD-ROM 50 is the CD-ROM 50A, the CD-ROM 50B, or the CD-ROM 50C depending upon the version of a marketed CD-ROM.

The key 32 of the AV amplifier 20 is operated to instruct an updating using the CD-ROM 50 Then, the load program 100 is read from the CD-ROM 50, and the load program 100 is loaded into the RAM 311 from the personal computer 40 via the communication port 312.

After loading, processing of a CPU (not shown) of the microcomputer 31 allows the routine of the load program 100 loaded in the RAM 311 to proceed to step 10, followed by step 102, in which the miscellaneous information 200 stored in the CD-ROM 50 is checked based on the model information stored in the flash memory 34 to determine whether or not the CD-ROM 50 supports the AV amplifier 20.

As a result of determination, if the CD-ROM 50 supports the AV amplifier 20, the routine proceeds from step 102 to step 103, in which the version flag VFLG stored in the flash memory 34 is retrieved. In step 104, the version flag VFLG retrieved from the flash memory 34 in step 103 is checked to determine whether or not the function program prepared in the CD-ROM 50 is qualified to be installed or rewritten to the flash memory 34.

If it is determined that the function program prepared in the CD-ROM 50 is qualified to be installed or rewritten to the flash memory 34, the routine proceeds from step 104 to step 111, in which a bit in the bits of the version flag VFLG in the flash memory 34 which corresponds to a function newly added by the CD-ROM 50 is set to "1". For example, when the CD-ROM 50 comprises the CD-ROM 50B and the function B is added, bit 1 in the bits of the version flag VFLG which corresponds to the function B is set to "1".

In order to set bit 1 to "1", the version flag VFLG is retrieved from the flash memory 34 to take a difference between the retrieved version flag VFLG and mask data in which bit 1 is "1" and the other bits are "0", and the result is written to the flash memory 34 as a new version flag VFLG. The same processing is performed in case where any other bit is set to "1".

In step 111, furthermore, the version information stored in the flash memory 34 is updated using the version information contained in the miscellaneous information 200 in the CD-ROM 50.

The routine then proceeds to step 112. In step 112, processing before the function program is written to the flash memory 34, for example, a process to display on the LCD 33 that the write processing is executed, is performed.

In step 113, the function program in the CD-ROM 50 is written to the flash memory 34. After the program has been written, in step 114, processing after the program is written to the flash memory 34, for example, a process to display on the LCD 33 that the writing in step 113 has been correctly executed, is performed. Then, in step 115, the program 100 ends.

If it is determined in step 102 that the CD-ROM 50 does not support the AV amplifier 20, the routine proceeds from step 102 to step 121, in which incompatibility of the CD-ROM 50 is displayed on the LCD 33. In step 122, then, the program 100 ends.

If it is determined in step 104 that the function program prepared in the CD-ROM 50 is not qualified to be installed to the flash memory 34, the routine proceeds from step 104 to step 131, in which it is determined whether or not the function program stored in the CD-ROM 50 is a freeware program, such as a bug-fixed function program.

If it is a freeware program, the routine proceeds from step 131 to step 111; and, as described above, the version flag VFLG stored in the flash memory 34 is updated in step 111, and the function program stored in the flash memory 34 is updated to the freeware function program stored in the CD-ROM 50 in step 113.

If the function program stored in the CD-ROM 50 is a shareware program in step 131, the routine proceeds from step 131 to step 132, in which the routine waits for entry of the CD key.

When the CD key given to the CD-ROM 50 is entered using the operation key 32, the routine proceeds from step 132 to step 133, in which it is determined whether or not the CD key entered in step 132 is correct. If the entered CD key is correct, the routine proceeds from step 133 to step 111; and, in the subsequent steps, the function program and the version flag VFLG in the flash memory 34 are updated in the way described above.

However, if the entered CD key is not correct in step 133, the routine proceeds from step 133 to step 134, in which, for example, the fact that the CD key is wrong is displayed on the LCD 33. Then, in step 115, the program 100 ends.

As described above, the function program 5A is programmed so as to implement the function A; the function program 5B is programmed so as to implement the function B as well as the function A when bit 0 of the version flag VFLG is set to "1"; and the function program 5C is programmed so as to implement the function C as well as the function A or the function B when bit 0 or bit 1 of the version flag VFLG is set to "1".

Thus, the function program in the CD-ROM 50 is installed to the flash memory 34 in the way described above to update the version flag VFLG, whereby only a function whose corresponding bit is set to "1" is effectively implemented.

In this way, a new function can be added to the above-described AV amplifier 20, in which case, in particular, the above-described AV amplifier 20 is designed so that, when a new function is added, a function program capable of implementing both the new function and a function which has been developed is stored in the flash memory 34 and a bit in the version flag VFLG which corresponds to the new function is updated.

Therefore, if functions A, B, C, . . . are developed and offered in order, for example, users can add only the function C, that is, users can select and add only an up-to-date function. Thus, if the functions are of different value, a desired function can be added at a price corresponding to the value thereof.

Although, in the previous description, files (the function program, the load program 100, and the miscellaneous information 200) in the CD-ROM 50 are read and supplied to the microcomputer 31 by the personal computer 40, the files may be read and supplied to the microcomputer 31 by the DVD player 10. Alternatively, the files may be supplied to the microcomputer 31 over the Internet or by a service using a file delivery system.

According to the present invention, an electronic device for implementing various functions by a DSP and a program executed by the DSP enables users to select and add only an up-to-date function if the various functions have been developed and offered in order. If the functions are of different value, a desired function can be added at a price corresponding to the value thereof.

The invention claimed is:

1. A method for enabling data to be stored in a flash memory, said method comprising:
   receiving a program having a plurality of functions associated therewith, in which each function was initially available at a different time so that the plurality of functions have a time order associated therewith such that a first function was initially available before a second function which was initially available before a third function and so forth;
   determining whether implementing of each function is allowed based on a version flag stored in the flash memory;
   enabling a user to update or set the version flag in the flash memory so that the user can select any one or ones of the plurality of functions of the program to be implemented regardless of the time order such that the user is able to select the third function without selecting the first function and the second function and is able to select the first function and the third function without selecting the second function; and
   storing the desired function or functions selected by the user in the flash memory;
   in which the respective function or functions of a received program can be implemented only when the version flag indicates that the implementation of the respective function or functions is allowed and in which the respective function or functions of the received program can not implemented when the version flag indicates that the implementation of the respective function or functions is not allowed, and in which less than all of the functions of the program can be stored in the flash memory in accordance with the version flag.

2. An electronic apparatus for enabling data to be stored in a flash memory, said apparatus comprising:
- an input to receive a program having a plurality of functions associated therewith, in which each function was initially available at a different time so that the plurality of functions have a time order associated therewith such that a first function was initially available before a second function which was initially available before a third function and so forth;
- a control circuit to determine whether implementing of each function is allowed based on a version flag stored in the flash memory;
- a device to enable a user to update or set the version flag in the flash memory so that the user can select any one or ones of the plurality of functions of the program to be implemented regardless of the time order such that the user is able to select the third function without selecting the first function and the second function and is able to select the first function and the third function without selecting the second function; and
- a device to enable the desired function or functions selected by the user to be stored in the flash memory;
- in which the respective function or functions of a received program can be implemented only when the version flag indicates that the implementation of the respective function or functions is allowed and in which the respective function or functions of the received program can not be implemented when the version flag indicates that the implementation of the respective function or functions is not allowed, and
- in which less than all of the functions of the program can be stored in the flash memory in accordance with the version flag.

3. An electronic apparatus comprising:
- an input to receive a program having a plurality of functions associated therewith, in which each function was initially available at a different time so that the plurality of functions have a time order associated therewith such that a first function was initially available before a second function which was initially available before a third function and so forth;
- a control circuit to determine whether implementing of each function is allowed based on a version flag stored in the flash memory;
- a processor to execute the program to implement an allowed function or functions;
- a device to enable a user to update or set the version flag in the flash memory so that the user can select any one or ones of the plurality of functions of the program to be implemented regardless of the time order such that the user is able to select the third function without selecting the first function and the second function and is able to select the first function and the third function without selecting the second function; and
- a device to enable the desired function or functions selected by the user to be stored in the flash memory;
- in which the respective function or functions of a received program can be implemented only when the version flag indicates that the implementation of the respective function or functions is allowed and in which the respective function or functions of the received program can not implemented when the version flag indicates that the implementation of the respective function or functions is not allowed, and
- in which less than all of the functions of the program can be stored in the flash memory in accordance with the version flag.

\* \* \* \* \*